United States Patent
Ezaki et al.

(10) Patent No.: US 8,661,238 B2
(45) Date of Patent: Feb. 25, 2014

(54) IDENTIFYING AN OS CORRESPONDING TO AN ADDRESS INCLUDED IN A MAGIC PACKET AND DETERMINING WHETHER ACTIVATION OF THE OS IS PERMITTED

(75) Inventors: Yutaka Ezaki, Kawasaki (JP); Masanobu Yuhara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 396 days.

(21) Appl. No.: 12/548,077

(22) Filed: Aug. 26, 2009

(65) Prior Publication Data

US 2009/0319768 A1 Dec. 24, 2009

Related U.S. Application Data

(63) Continuation of application No. PCT/JP2007/056493, filed on Mar. 27, 2007.

(51) Int. Cl.
*G06F 15/177* (2006.01)
*G06F 1/00* (2006.01)

(52) U.S. Cl.
USPC .................. 713/100; 713/1; 713/2; 713/300; 713/310

(58) Field of Classification Search
USPC .................................. 713/1, 2, 300, 100, 310
See application file for complete search history.

(56) References Cited

U.S. PATENT DOCUMENTS

| 5,802,305 | A | * | 9/1998 | McKaughan et al. | ........ 709/227 |
|---|---|---|---|---|---|
| 5,835,719 | A | | 11/1998 | Gibson et al. | |
| 5,938,771 | A | | 8/1999 | Williams et al. | |
| 5,983,353 | A | * | 11/1999 | McHann, Jr. | ................. 713/310 |
| 6,405,259 | B1 | * | 6/2002 | Cheston et al. | ............... 709/245 |
| 6,694,440 | B1 | | 2/2004 | Ishibashi | |
| 6,915,346 | B1 | * | 7/2005 | Kato et al. | .................... 709/227 |
| 7,251,736 | B2 | | 7/2007 | Dayan et al. | |
| 2005/0154928 | A1 | * | 7/2005 | Larson et al. | ................. 713/300 |
| 2006/0036877 | A1 | * | 2/2006 | Anderson et al. | ............ 713/300 |
| 2008/0059641 | A1 | * | 3/2008 | Hernandez et al. | ........... 709/229 |
| 2008/0089338 | A1 | * | 4/2008 | Campbell et al. | ............. 370/392 |

FOREIGN PATENT DOCUMENTS

| JP | B2 2543640 | 7/1996 |
|---|---|---|
| JP | A 10-507855 | 7/1998 |
| JP | A 11-175201 | 7/1999 |
| JP | A 2000-209220 | 7/2000 |
| JP | A 2000-295257 | 10/2000 |
| JP | A 2003-162515 | 6/2003 |
| JP | A 2005-20728 | 1/2005 |

OTHER PUBLICATIONS

Advanced Micro Devices; "Magic Packet Technology;" Nov. 1995.

(Continued)

*Primary Examiner* — Vincent Tran
(74) *Attorney, Agent, or Firm* — Fujitsu Patent Center

(57) ABSTRACT

To activate respective OSs separately through a network even in a virtual machine in which a plurality of OSs are installed, an M-packet acquiring unit acquires a received magic packet. An address detecting unit detects a MAC address that is stored in the magic packet. A control-list storage unit records correspondence between MAC addresses and guest OSs, and defines whether to activate the respective OSs by a remote operation. An activation determining unit refers to the control-list storage unit and determines whether to activate a guest OS that corresponds to the MAC address stored in the magic packet. A guest-OS control unit activates a guest OS that is determined to be activated by the activation determining unit.

8 Claims, 4 Drawing Sheets

(56) References Cited

OTHER PUBLICATIONS

Partial English-language Translation of JP-2003-162515-A.

Japanese Office Action mailed Apr. 10, 2012 for corresponding Japanese Application No. 2009-506184, with Partial English-language Translation.

* cited by examiner

FIG.2

| SOURCE ADDRESS | DESTINA-TION ADDRESS | IP HEADER | SYN-CHRONI-ZATION BIT | MAC ADDRESS | ... | MAC ADDRESS | CRC |

16 TIMES (bracket covering MAC ADDRESS ... MAC ADDRESS)

FIG.3

| MAC ADDRESS | GUEST OS | WOL |
|---|---|---|
| 0x0017421405e6 | 160-1 | ACTIVATE |
| 0x0017421405e7 | 160-2 | ACTIVATE |
| 0x0017421405e8 | 160-3 | NOT ACTIVATE |
| 0x0017421405e9 | 160-4 | NOT ACTIVATE |
| 0x0017421405ea | 160-5 | ACTIVATE |
| ⋮ | | |

| MAC ADDRESS | GUEST OS | WOL | EXCLUDED SOURCE ADDRESS |
|---|---|---|---|
| 0x0017421405e6 | 160-1 | ACTIVATE | 192.100.xx.xx<br>192.168.xx.xx |
| 0x0017421405e7 | 160-2 | ACTIVATE | |
| 0x0017421405e8 | 160-3 | NOT ACTIVATE | |
| ⋮ | | | |

IDENTIFYING AN OS CORRESPONDING TO AN ADDRESS INCLUDED IN A MAGIC PACKET AND DETERMINING WHETHER ACTIVATION OF THE OS IS PERMITTED

CROSS-REFERENCE TO RELATED APPLICATION

This application is a continuation of PCT international application Ser. No. PCT/JP2007/056493 filed on Mar. 27, 2007 which designates the United States, the entire contents of which are incorporated herein by reference.

FIELD

The embodiments discussed herein are directed to a computer in which a plurality of operating systems (OS) including a host OS that provides basic functions are installed, a remote activation method, and a remote activation program.

BACKGROUND

Conventionally, for example, Wake-on-LAN (WOL) described in Japanese Laid-open Patent Publication No. 2000-209220 is available as a function of remotely operating a personal computer, a server, and the like. WOL is a technique of activating a computer that is connected to a local area network (LAN) when this computer is in an inactive state by controlling from another computer connected to the same LAN. By using WOL, for example, an administrator of the network may manage a computer at a remote site by operating a computer present nearby.

To use WOL, a network card, a motherboard, a basic input/output system (BIOS), an OS, and the like of a computer to be activated should support WOL.

In recent years, a virtual machine (VM) that allows more than one OS to operate on a single computer is attracting attentions. In a virtual machine, a host OS that is activated first when the computer is turned on and a guest OS that operates on the host OS may operate at the same time. Therefore, it becomes possible to use software that may work only on a certain OS also in hardware that uses another OS as the host OS.

When WOL is applied to such a virtual machine, generally, the computer is turned on, and the host OS is activated. However, a guest OS installed in the computer is not activated, and it is difficult to manage a guest OS from a remote site.

Particularly, more than one guest OS may be installed in a single computer. Therefore, just by instructing activation from a remote site through a network, it may not be specified which guest OS should be activated, and a problem peculiar to a virtual machine occurs.

In addition, to save computer resources, it is preferable that an unnecessary guest OS should be stopped even in a state where the host OS is activated. However, if a guest OS is stopped once, activation using WOL is impossible in a present situation. Accordingly, an unnecessary guest OS can be kept active, preparing for a remote operation.

SUMMARY

According to an aspect of an embodiment of the present invention, a computer in which a plurality of operating systems (OS) including a host OS that provides basic functions are installed, includes an acquiring unit that acquires a magic packet that instructs activation of an OS through a network; a detecting unit that detects address information that is stored in the magic packet acquired by the acquiring unit; a determining unit that determines whether to activate an OS that corresponds to the address information detected by the detecting unit; and a control unit that activates the OS that corresponds to the address information when it is determined to activate the OS as a result of determination by the determining unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a view depicting a format example of a magic packet according to the embodiment;

FIG. 3 is a view depicting one example of a control list according to the embodiment;

DESCRIPTION OF EMBODIMENTS

The main point of the present invention is that an OS intended to be activated is identified from a media access control (MAC) address included in a magic packet for WOL, it is determined whether activation of this OS is permitted, and if permitted, the specified OS is activated. An embodiment of the present invention is explained in detail below with reference to the accompanying drawings.

Figure 1:
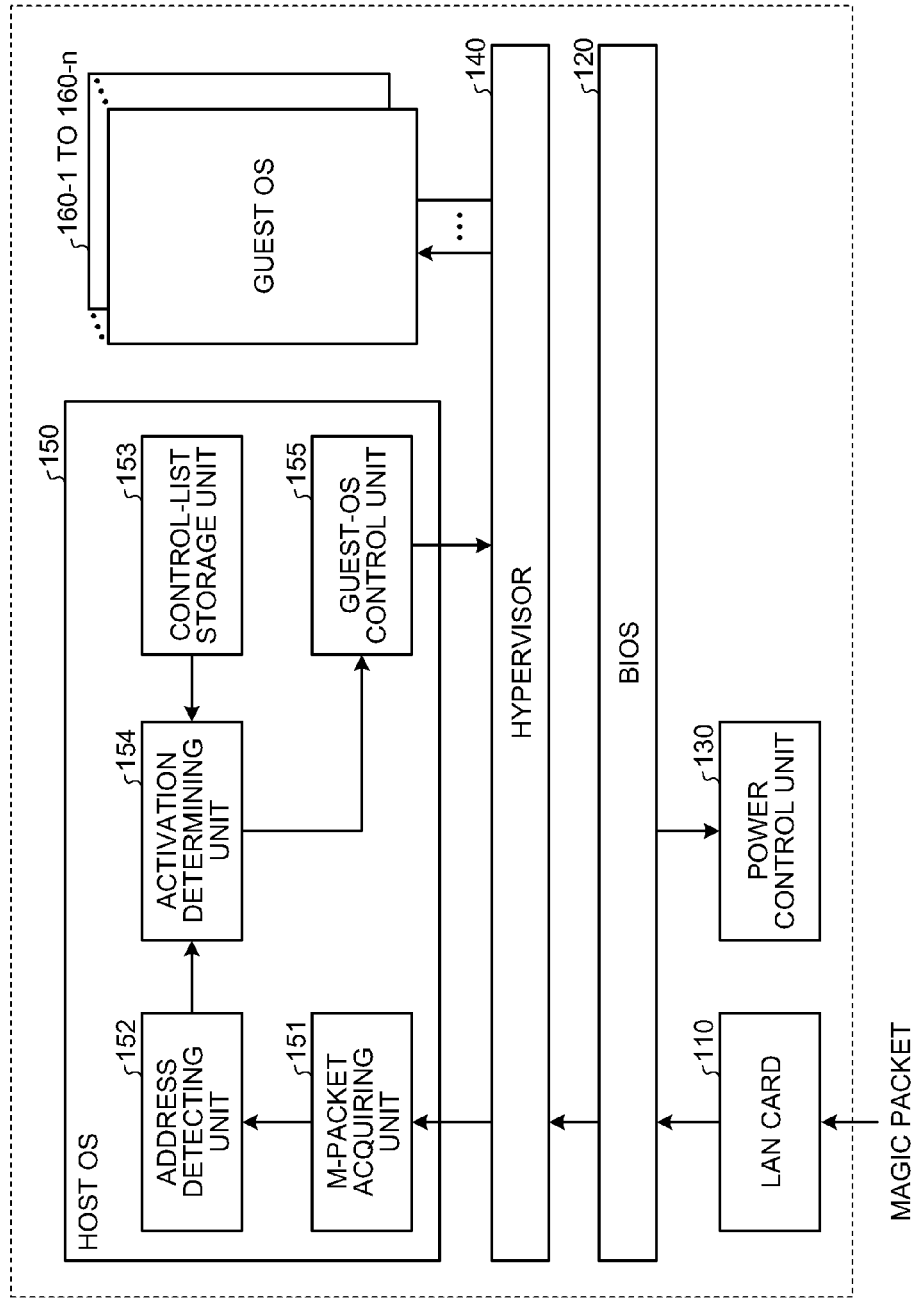
FIG. 1 is a block diagram depicting an essential part of a computer according to an embodiment.

FIG. 1 is a block diagram depicting an essential part of a computer according to the embodiment. The computer depicted in FIG. 1 includes a LAN card 110, a BIOS 120, a power control unit 130, a hypervisor 140, a host OS 150, and guest operating systems (OSs) 160-1 to 160-n (n is a positive integer).

The LAN card 110 is an interface that connects the computer to a LAN (not depicted), and receives a magic packet instructing the activation of the host OS 150 or the guest OSs 160-1 to 160-n. When the received magic packet indicates the activation of the host OS 150, the LAN card 110 instructs the power control unit 130 to turn on the power of the computer through the BIOS 120.

A magic packet has a configuration as depicted in FIG. 2, for example. Specifically, in a magic packet, a source address and a destination address of the magic packet are positioned at the top. The source address is an address of a computer that activates the computer depicted in FIG. 1 through a network, and is a source address of the magic packet. The destination address is an address of the computer depicted in FIG. 1, and is a destination address of the magic packet.

Furthermore, a magic packet includes a predetermined IP header in the Internet protocol, a synchronization bit used in synchronization, a cyclic redundancy check (CRC) used for error check of the magic packet, and the like. Further, as information specifying an OS to be activated, the MAC address corresponding to one of the host OS 150 and the guest OSs 160-1 to 160-*n* is repeated 16 times in the magic packet.

Therefore, when the MAC address in the received magic packet specifies the host OS 150, the LAN card 110 instructs the power control unit 130 to turn on the power of the computer through the BIOS 120. When the MAC address in the magic packet specifies the guest OSs 160-1 to 160-*n*, the LAN card 110 outputs the magic packet to the host OS 150 through the BIOS 120 and the hypervisor 140.

The BIOS 120 provides an environment enabling basic input/output with respect to peripheral devices including the LAN card 110 and the power control unit 130, to the host OS 150 and the guest OSs 160-1 to 160-*n*.

The power control unit 130 turns on the power of the computer when the magic packet to activate the host OS 150 is received by the instruction from the LAN card 110 through the BIOS 120. By turning on the power of the computer by the power control unit 130, the host OS 150 is activated.

The hypervisor 140 virtualizes the hardware such that the host OS 150 and the guest OSs 160-1 to 160-*n* can use the hardware of the computer. Therefore, the host OS 150 and the guest OSs 160-1 to 160-*n* operate on the hypervisor 140.

The host OS 150 is basic software to be a basis of operation of the computer, and is activated when the computer is turned on by the power control unit 130. Moreover, the host OS 150 controls the activation of the guest OSs 160-1 to 160-*n* when a magic packet instructing activation of the guest OSs 160-1 to 160-*n* is received.

Specifically, the host OS 150 includes a magic-packet acquiring unit (hereinafter, "M-packet acquiring unit") 151, an address detecting unit 152, a control-list storage unit 153, an activation determining unit 154, and a guest-OS control unit 155.

The M-packet acquiring unit 151 acquires a magic packet that is received by the LAN card 110 and that instructs the activation of one of the guest OSs 160-1 to 160-*n*.

The address detecting unit 152 detects a MAC address stored in the magic packet acquired by the M-packet acquiring unit 151. Specifically, the address detecting unit 152 detects a MAC address specifying an OS to be activated from the magic packet, and gives information of the MAC address to the activation determining unit 154. Furthermore, the address detecting unit 152 may detect a source address of the magic packet besides the MAC address in the magic packet to inform the activation determining unit 154.

The control-list storage unit 153 stores therein correspondence between MAC addresses and the guest OSs 160-1 to 160-*n*, and defines whether to activate each of the guest OSs 160-1 to 160-*n* by a remote operation. Specifically, the control-list storage unit 153 stores, for example, a control list that indicates whether to actually activate OSs when magic packets instructing the activation of the respective guest OSs 160-1 to 160-*n* are received in addition to the guest OSs 160-1 to 160-*n* corresponding to MAC addresses as depicted in FIG. 3. For example, in the control list depicted in FIG. 3, while it is defined that when a magic packet storing a MAC address "0x0017421405e6" is received, the guest OS 160-1 corresponding to this MAC address is to be activated, it is defined that when a magic packet storing a MAC address "0x0017421405e8" is received, the guest OS 160-3 corresponding to this MAC address is not to be activated.

Figures 4, 5:
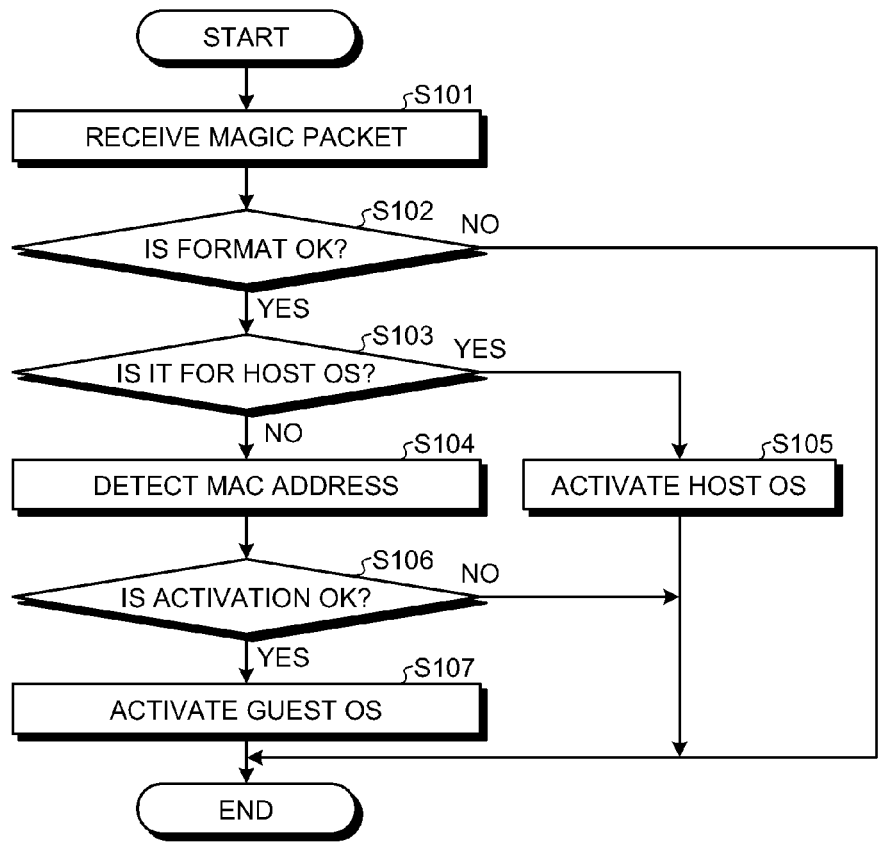
FIG. 4 is a view depicting another example of the control list according to the embodiment.
FIG. 5 is a flowchart depicting operation according to the embodiment when the magic packet is received.

Furthermore, the control-list storage unit 153 may store therein a control list that defines whether to activate the guest OSs 160-1 to 160-*n* depending on a source address of a magic packet as depicted in FIG. 4, for example. Specifically, in the control list depicted in FIG. 4, it is defined that although when a magic packet storing a MAC address "0x0017421405e6" is received, the guest OS 160-1 corresponding to this MAC address is to be activated, if the source address of the magic packet is "192.100.xx.xx" or "192.168.xx.xx", the guest OS 160-1 is not to be activated. In the control list, conditions for determining whether to allow the activation of the guest OSs 160-1 to 160-*n* by a remote operation may be defined in addition to the conditions described above.

When the MAC address is informed by the address detecting unit 152, the activation determining unit 154 determines whether to activate one of the guest OSs 160-1 to 160-*n* corresponding to the MAC address, referring to the control list stored in the control-list storage unit 153. Specifically, the activation determining unit 154 identifies one of the guest OSs 160-1 to 160-*n* corresponding to the MAC address informed by the address detecting unit 152 from the control list stored in the control-list storage unit 153, and determines whether the activation by a remote operation is permitted for this one of the guest OSs 160-1 to 160-*n* from the control list. The activation determining unit 154 may determine whether the activation of this one of the guest OSs 160-1 to 160-*n* by a remote operation is permitted based on a source address of the magic packet informed by the address detecting unit 152.

The guest-OS control unit 155 activates this one of the guest OSs 160-1 to 160-*n* through the hypervisor 140 when this one of the guest OSs 160-1 to 160-*n* is determined to be activated by the activation determining unit 154.

The guest OSs 160-1 to 160-*n* are basic software different from the host OS 150, and may operate an application and the like that do not operate on the host OS 150. The activation of the guest OSs 160-1 to 160-*n* is controlled by the guest-OS control unit 155 in the host OS 150.

Next, operation of the computer configured as described above at the time of reception of a magic packet is explained referring to a flowchart depicted in FIG. 5.

First, a magic packet transmitted from another computer is received by the LAN card 110 of the computer depicted in FIG. 1 through a LAN (step S101). When the magic packet is receive d by the LAN card 110, it is determined whether the format of this magic packet is of a proper magic packet (step S102), and if the magic packet is an improper packet, it is discarded by the LAN card 110.

If the format of the magic packet is of a proper one (YES at step S102), the MAC address stored in the magic packet is referred by the LAN card 110, and it is determined whether the magic packet instructs the activation of the host OS 150 (step S103). Specifically, it is determined whether the MAC address repeated 16 times in the magic packet is the MAC address of the host OS 150. When the MAC address is the one corresponding to the host OS 150 (YES at step S103), an instruction is sent from the LAN card 110 to the power control unit 130 through the BIOS 120, and the power of the computer is turned on. According to this power-on, the host OS 150 is activated (step S105).

On the other hand, when the MAC address is not the one corresponding to the host OS 150 (NO at step S103), the magic packet is output from the LAN card 110, and is acquired by the M-packet acquiring unit 151 of the host OS 150. If the host OS 150 is inactive at this time, the magic packet is discarded by the LAN card 110. When the host OS 150 is active and the magic packet is acquired by the M-packet acquiring unit 151, the address detecting unit 152 detects the MAC address stored in the magic packet acquired by the M-packet acquiring unit 151 (step S104). The address detecting unit 152 may be configured to detect the source address of the magic packet together with the MAC address at this time.

When the address detecting unit 152 detects the MAC address, the activation determining unit 154 determines one of the guest OSs 160-1 to 160-n that corresponds to the detected MAC address, and determines whether to activate this one of the guest OSs 160-1 to 160-n (step S106). Specifically, the activation determining unit 154 reads one of the guest OSs 160-1 to 160-n that corresponds to the MAC address from the control-list storage unit 153, and reads whether the activation by a remote operation for this one of the guest OSs 160-1 to 160-n is permitted from the control-list storage unit 153 at the same time. Whether to permit activation by a remote operation may be defined for each of the guest OSs 160-1 to 160-n, or may be defined such that activation is restrained for a certain source address of a magic packet.

When it is found that the activation by a remote operation is not permitted as a result of the determination by the activation determining unit 154 (NO at step S106) processing is ended without activating the guest OSs 160-1 to 160-n. On the other hand, when the activation by a remote operation is permitted (YES at step S106), one of the guest OSs 160-1 to 160-n to be activated is informed to the guest-OS control unit 155 from the activation determining unit 154, and the guest-OS control unit 155 activates the one of the guest OSs 160-1 to 160-n informed by the activation determining unit 154 through the hypervisor 140 (step S107).

As described in the embodiment, one of the guest OSs 160-1 to 160-n is uniquely identified from the MAC address stored in a magic packet, it is determined whether the activation by a remote operation is permitted for the one of the guest OSs 160-1 to 160-n being an activation subject from the control list, and the one of the guest OSs 160-1 to 160-n is activated from the host OS 150 only when permitted. Therefore, even in a virtual machine in which a plurality of OSs are installed, the respective OSs can be activated separately through a network. Furthermore, if restriction of activation of the guest OSs 160-1 to 160-n depending on a source address of a magic packet is defined in the control list, activation of the guest OSs 160-1 to 160-n by a remote control can be limited, thereby maintaining safety in terms of security.

Figure 6:
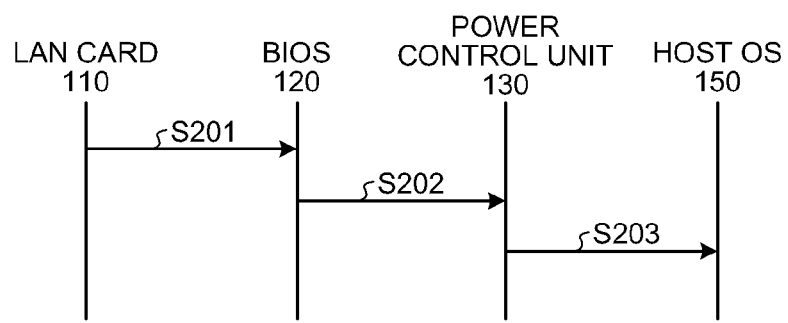
FIG. 6 is a sequence diagram depicting operation according to the embodiment when a host OS is activated.
Figure 7:
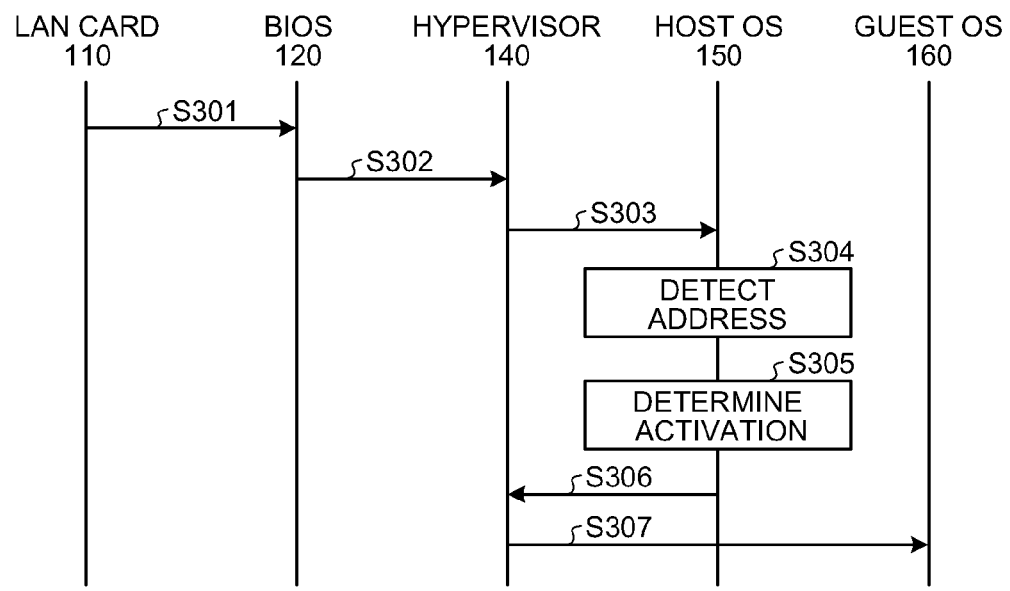
FIG. 7 is a sequence diagram depicting operation according to the embodiment when a guest OS is activated.

Next, operation when the magic packet instructing activation of the host OS 150 is received by the computer and when the magic packet instructing activation of the guest OSs 160-1 to 160-n is received by the computer is explained referring to sequence diagrams depicted in FIG. 6 and FIG. 7. First, referring to FIG. 6, the operation when the magic packet instructing activation of the host OS 150 is received is explained.

When the LAN card 110 receives a magic packet, the MAC address stored in this magic packet is checked. In this example, the LAN card 110 determines that the activation of the host OS 150 is instructed. In this case, the LAN card 110 sends an instruction to turn on the power of the computer to the BIOS 120 (step S201), and the BIOS 120 transfers this instruction to the power control unit 130 (step S202). The power of the computer is turned on by the power control unit 130, and an activation instruction is sent to the host OS 150 (step S203) and the host OS 150 is activated.

Thus, the computer depicted in FIG. 1 is turned on by the magic packet transmitted from another computer connected to the LAN, and the host OS 150 is activated. The activation of the host OS 150 enables the control of activation of the guest OSs 160-1 to 160-n when a magic packet instructing activation of the guest OSs 160-1 to 160-n is received as explained below.

FIG. 7 is a sequence diagram depicting the operation in the computer when a magic packet instructing activation of the guest OSs 160-1 to 160-n is received.

When the LAN card 110 receives a magic packet, the MAC address stored in this magic packet is checked. In this example, the LAN card 110 determines that the activation of the host OS 150 is not instructed. In this case, the LAN card 110 sends the magic packet to the BIOS 120 (step S301). The magic packet is transferred from the BIOS 120 to the hypervisor 140 (step S302), and is further transferred to the host OS 150 (step S303).

The magic packet is acquired by the M-packet acquiring unit 151, and the MAC address stored in the magic packet is detected by the address detecting unit 152 (step S304). The MAC address is informed to the activation determining unit 154. The activation determining unit 154 refers to the control list stored in the control list storage unit 153, thereby determining whether to activate one of the guest OSs 160-1 to 160-n corresponding to the MAC address (step S305).

In this example, it is determined to activate the one of the guest OSs 160-1 to 160-n corresponding to the MAC address. The guest-OS control unit 155 sends an instruction to activate the one of the guest OSs 160-1 to 160-n corresponding to the MAC address to the hypervisor 140 (step S306), and either one of the guest OSs 160-1 to 160-n specified thereby (simply indicated as "guest OS 160" in FIG. 7) is activated by the hypervisor 140 (step S307).

As described, in the present embodiment, when the computer receives a magic packet storing a MAC address that specifies an OS to be activated, the computer detects the MAC address from the magic packet, determines whether the activation of the guest OS corresponding to this MAC address is permitted from the control list, and activates the guest OS corresponding to the MAC address if the activation is permitted. Accordingly, a host OS and a plurality of guest OSs are identified by a MAC address included in a magic packet, and the respective OSs can be separately activated through a network even in a virtual machine having a plurality of OSs. Moreover, when a guest OS is to be activated, whether the activation thereof is permitted is determined, thereby maintaining safety in terms of security.

According to the embodiments, a host OS and a plurality of guest OSs may be identified based on address information included in a magic packet, and whether activation by a remote operation is permitted may be determined. Therefore, even in a virtual machine having a plurality of OSs, the respective OS may be separately activated through a network.

Moreover, according to the embodiments, it is possible to set, for each OS, whether to permit activation by a remote operation, and remote activation of an OS in a virtual machine may be flexibly controlled.

Furthermore, according to the embodiments, remote activation of an OS may be restricted depending on a source address of a magic packet, thereby maintaining safety in terms of security.

Moreover, according to the embodiments, even in a computer in which a plurality of guest OSs are installed in addition to a host OS, a guest OS to be activated may be accurately identified, and it is possible to activate the specified guest OS accurately.

Furthermore, according to the embodiments, a host OS is activated by turning on a computer by a remote operation, and thereafter, a guest OS may be activated by processing on the host OS when a magic packet to instruct activation of the guest OS is received.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a depicting of the superiority and inferiority of the invention. Although the embodiment of the present inventions has been described in detail, it should be understood that the various changes, substitutions, and alterations could be made hereto without departing from the spirit and scope of the invention.

What is claimed is:

1. A computer in which a plurality of operating systems (OS) including a host OS are installed, the computer comprising:
   a memory unit that stores therein an activation list including a plurality of address information corresponding to the plurality of OS, respectively, and including a plurality of settings whether each of the plurality of OS is permitted to be activated by a remote operation;
   an interface that acquires a packet that instructs activation of an OS, and determines whether the OS corresponding to address information stored in the acquired packet is the host OS;
   a determining unit that identifies, from the activation list stored in the memory unit, the OS corresponding to the address information when the OS corresponding to the address information stored in the acquired packet is determined not to be the host OS by the interface and the host OS is active, and determines whether activation by the remote operation is permitted for the identified OS by referring to the activation list; and
   a control unit that activates the OS corresponding to the address information when the activation by the remote operation is permitted.

2. The computer according to claim 1, wherein the determining unit determines whether to activate the identified OS depending on a source address of the packet.

3. The computer according to claim 1, further comprising a power control unit that turns on the computer to activate the host OS, when the OS corresponding to the address information stored in the acquired packet is determined to be the host OS by the interface.

4. A remote activation method for a computer in which a plurality of operating systems (OS) including a host OS are installed, the remote activation method comprising:
   acquiring a packet that instructs activation of an OS;
   determining whether the OS corresponding to address information stored in the acquired packet is the host OS;
   identifying, when the host OS is active on being determined that the OS corresponding to the address information stored in the acquired packet is not the host OS, the OS corresponding to the address information from an activation list indicating correspondence between address information and the OS, the activation list defining whether to activate the OS by a remote operation;
   determining whether activation by the remote operation is permitted for the identified OS by referring to the activation list; and
   activating the OS corresponding to the address information when the activation by the remote operation is permitted.

5. The remote activation method according to claim 4, wherein the determining includes determining whether to activate the identified OS depending on a source address of the packet.

6. The remote activation method according to claim 4, further comprising turning on the computer to activate the host OS, when it is determined that the OS corresponding to the address information stored in the acquired packet is the host OS at the determining.

7. A non-transitory computer-readable recording medium that stores therein a computer program that remotely activates a computer in which a plurality of operating systems (OS) including a host OS are installed, the computer program causing the computer to execute:
   acquiring a packet that instructs activation of an OS;
   determining whether the OS corresponding to address information stored in the acquired packet is the host OS;
   identifying, when the host OS is active on being determined that the OS corresponding to the address information stored in the acquired packet is not the host OS, the OS corresponding to the address information from an activation list indicating correspondence between address information and the OS, the activation list defining whether to activate the OS by a remote operation;
   determining whether activation by the remote operation is permitted for the identified OS by referring to the activation list; and
   activating the OS corresponding to the address information when the activation by the remote operation is permitted.

8. The non-transitory computer-readable recording medium according to claim 7, wherein the computer program further causes the computer to execute determining whether to activate the identified OS depending on a source address of the packet.

* * * * *